I. J. GLERUM.
CHAIN HARROW.
APPLICATION FILED JAN. 28, 1915.
1,198,533.
Patented Sept. 19, 1916.
3 SHEETS—SHEET 1.
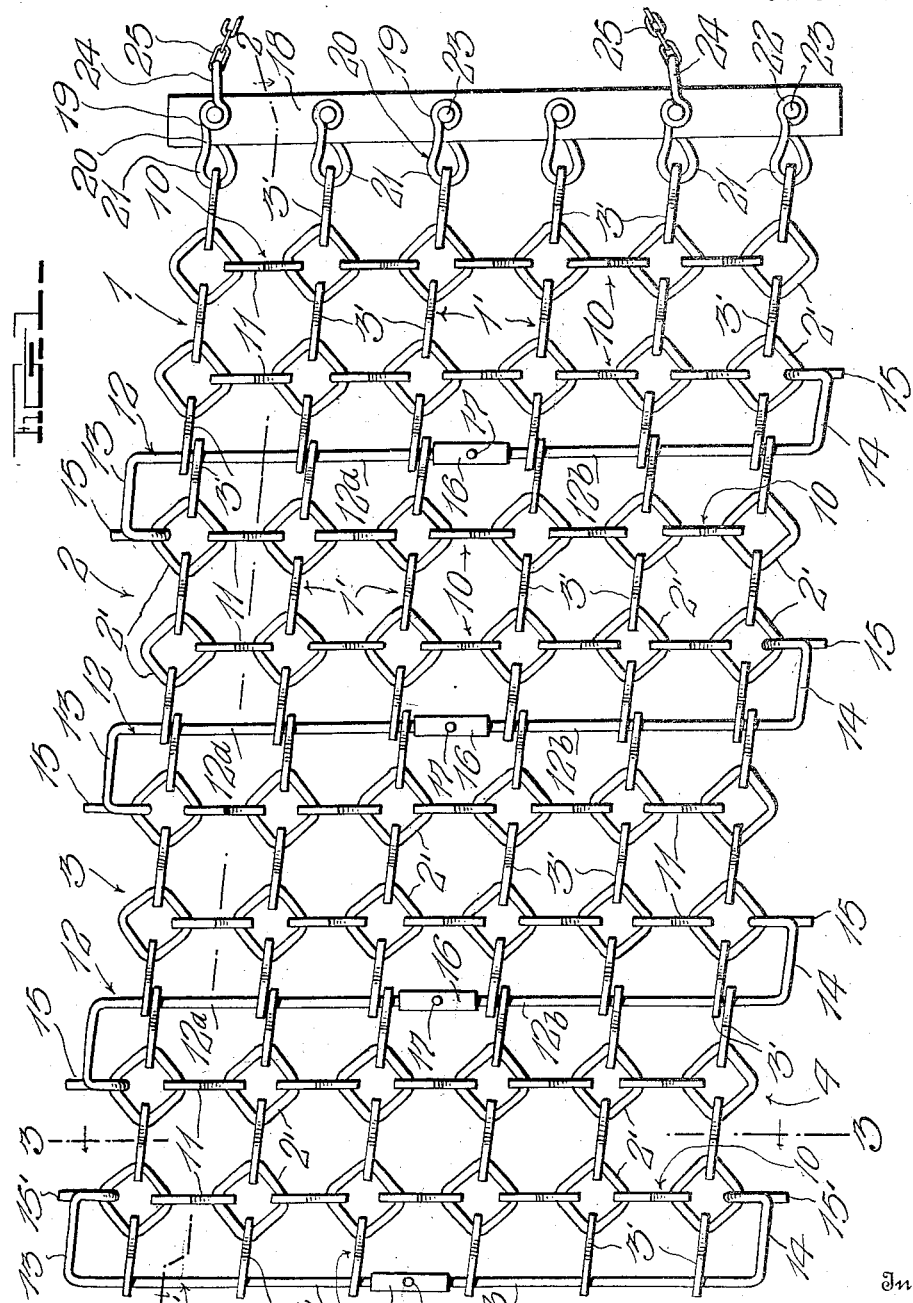

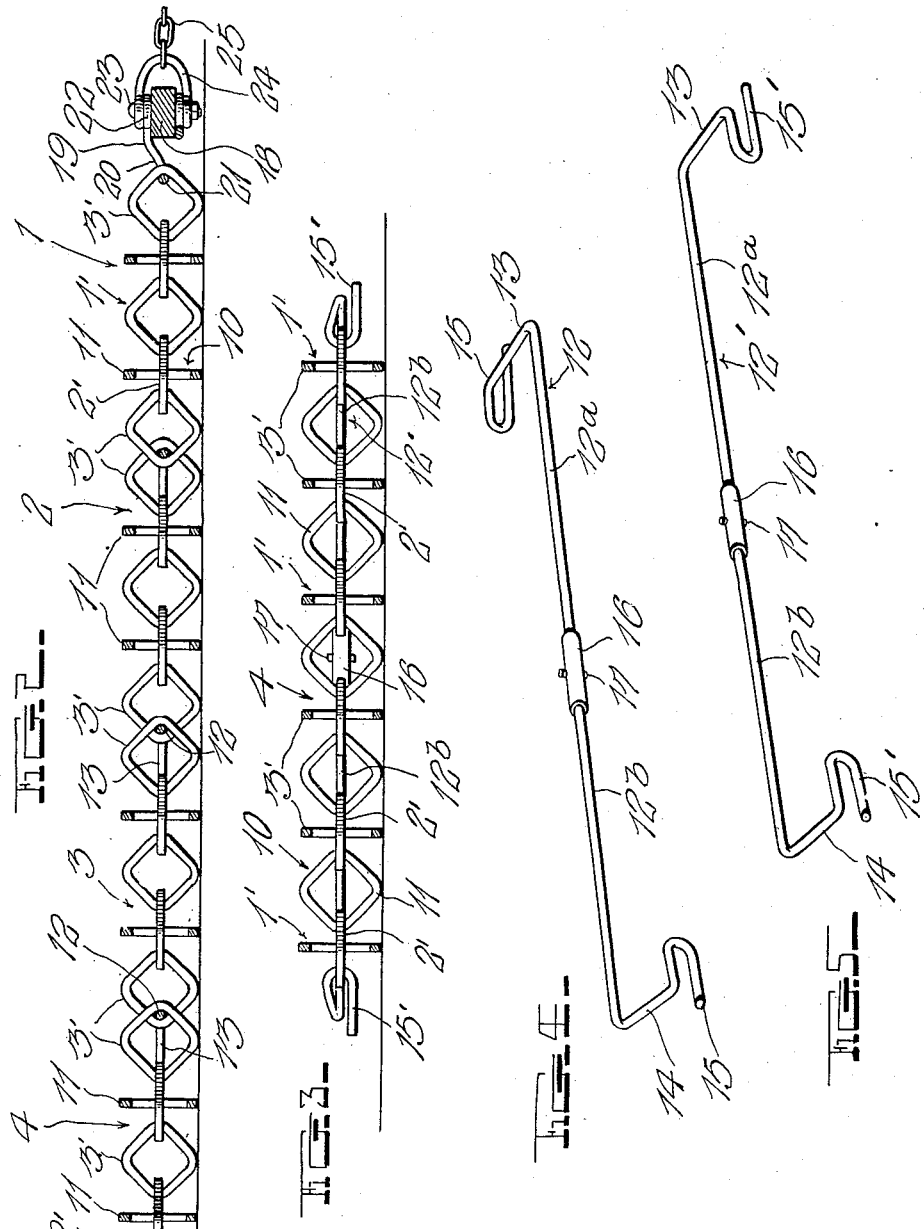

I. J. GLERUM.
CHAIN HARROW.
APPLICATION FILED JAN. 28, 1915.
1,198,533.
Patented Sept. 19, 1916.
3 SHEETS—SHEET 3.
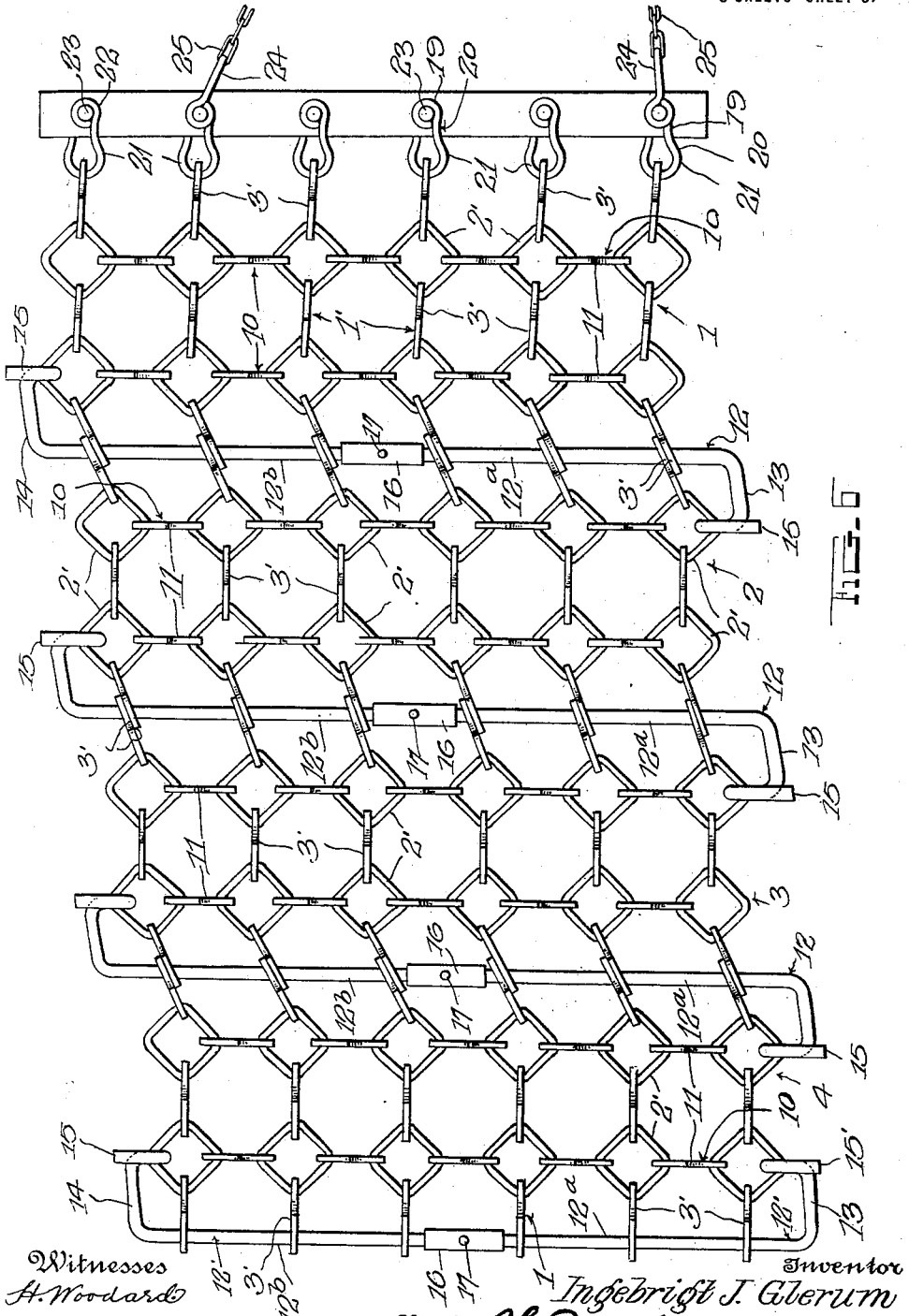

UNITED STATES PATENT OFFICE.

INGEBRIGT J. GLERUM, OF DEVILS LAKE, NORTH DAKOTA.

CHAIN HARROW.

1,198,533.                  Specification of Letters Patent.      Patented Sept. 19, 1916.

Application filed January 28, 1915. Serial No. 4,910.

*To all whom it may concern:*

Be it known that I, INGEBRIGT J. GLERUM, a citizen of the United States, residing at Devils Lake, in the county of Ramsey and State of North Dakota, have invented certain new and useful Improvements in Chain Harrows; and I do declare the following to be a full, clear, and exact description of the invention, such as will enable others skilled in the art to which it appertains to make and use the same.

This invention relates to improvements in chain drags or harrows.

The object of the invention is to provide a harrow of this character so constructed, that some of the links thereof will be positioned out of longitudinal alinement and thus prevent them from following in the path of those in advance.

Another object is to construct a sectional harrow of this character to provide for the use of a harrow of any desired size, and in which the sections are interchangeable to adapt those at the front which receive the greatest amount of wear, to be shifted so that the respective sections will wear evenly.

With the above and other objects in view, the invention consists of certain novel features of construction, combination and arrangement of parts as will be more fully described and claimed.

In the accompanying drawings:—Figure 1 represents a bottom plan view of a harrow constructed in accordance with this invention and shown stretched in the position it assumes when a pull in opposite directions is exerted at the center of the draw bar and at the rear rod; Fig. 2 is a longitudinal section taken on the line 2—2 of Fig. 1; Fig. 3 is a transverse section taken on the line 3—3 of Fig. 1; Fig. 4 is a detail perspective view of one of the intermediate connecting rods in inverted position; Fig. 5 is a similar view of the rear end rod. Fig. 6 is a top plan view showing the parts of the harrow in the positions assumed when in operation.

In the embodiment illustrated, a flexible harrow is shown composed of a plurality of longitudinally disposed connected sections 1, 2, 3 and 4 which when connected in operative position, form substantially a rhombic parallelogram. As shown, these sections are similarly constructed but the size thereof may be varied if desired. As shown the completed harrow constructed of these sections is composed of rectangular links of uniform size which are linked together longitudinally and transversely of the harrow forming respectively longitudinal and transverse rows 1' and 10 in which the alternate links 2' of the longitudinal rows 1' are connected by cross links 11 with the opposite links of the adjacent longitudinal rows so that these alternate links are held approximately in a horizontal plane while the other links 3' of the longitudinal rows connecting said alternate links 2' are disposed vertically to form runners to cut open the soil and clods, thus assisting in pulverizing them. The cross links 11 of the transverse rows which connect the horizontally disposed links 2' are also vertically disposed but extend in a plane at right angles to the plane of the links 3' of the longitudinal rows, thereby presenting a comparatively wide breaking surface which operates in planes between the planes in which the vertical longitudinal links 3' operate. The horizontal links 2' connect the vertical links 3' of the longitudinal rows 1' and also the vertical links 11 of the transverse rows 10, being so disposed that one pair of diametrically opposite corners of said links 2' are engaged with two of the cross links 11 and the other pair of corners with two of the vertical links 3' of the longitudinal rows.

Each of the sections 1, 2, 3 and 4 as shown is composed of five rows of links extending longitudinally of each section, three of said rows being composed of vertical links 3' which links extend transversely of the sections and longitudinally of the drag of which said section forms a part, said rows of vertical links being arranged one row at the middle of the section and the other two at the opposite side edges thereof. The other two rows of the sections are each composed of connected alternating flat or horizontally disposed links 2' and of vertically disposed links 11, the horizontal links 2' being engaged also with the vertical links 3' of which the first named three rows are constructed. These sections are connected in progressive offset relation longitudinally so that the links of one section will not follow in the paths of those in the other sections, and thus more thoroughly harrow and pulverize the soil over which they are drawn as shown.

The connection of the respective sections is effected by means of cross rods 12 which are threaded through the vertical links 3' at the rear of one section and those at the front of an adjacent section, the links of one section being disposed adjacent those of the other section in overlapping relation, and are held at an oblique angle when in use by the connection of the rod 12 as will be described. The opposite ends of these rods 12 are bent laterally in opposite directions to form obliquely disposed outwardly inclined arms 13 and 14, both of which occupy the same plane with each other and with the rod proper. These arms 13 and 14 are provided at their terminals with outwardly opening inwardly extending hooks 15 arranged substantially parallel with the rod 12. These hooks 15 which extend longitudinally beyond the ends of the rod proper, are designed to be engaged one with the end link 2' at the rear of the front section on one side of the harrow, and the other with a similar link of the rear section at the other side of the harrow, whereby the rows and the sections are held in progressive offset relation longitudinally to adapt them when connected, to form a substantially rhombic parallelogram and whereby the links 3' of the sections connected by said rod, are held in close proximity in overlapping relation, and at an oblique angle when in use.

Each of the rods 12 is preferably formed in two sections 12ª and 12ᵇ with their inner ends connected by a sleeve 16 through which between said ends, a pin 17 passes. By this means, these rod sections are permitted to turn independently of each other and also to have a limited longitudinal movement in said sleeve and thus avoid danger of bending or breaking of the rods when in use. It will be obvious that by so constructing and connecting the sections the two meeting rows of vertical links of the adjacent sections and one of the rows of vertical and horizontal links of each of said sections will be held connected against pivotal movement relatively to each other while the intermediate or middle row of vertical links of each section will have pivotal connection with the rows on both sides thereof thereby permitting the four rows of links which extend transversely of the harrow and are held rigid by each rod 12 to have pivotal connection with those so held by the other rods. This connection of the rods with the rows of adjacent sections positions said sections in offset relation longitudinally of the drag and which are more particularly so disposed when in use as is seen in Fig. 6.

The connecting and stretching rod 12' at the rear end of the drag is similar in construction to the intermediate rods 12 except that the hooks 15' are positioned on the same side of the rod instead of on opposite sides and both are connected with the same row of connected horizontal and vertical links of the rear section 4, said rod being passed through the final row of vertical links of said section.

A draw bar 18 is shown arranged transversely and connected with the front section 1 by open links or clevises 19, one of which is connected with each of the vertically disposed front links 3'. The arms 20 of these links 19 are twisted to position the looped intermediate portion 21 thereof in a horizontal plane, when said arms are disposed on opposite sides of the bar 18, said looped portions 21 being thus positioned for engagement with the links 3' at the front of section 1 to assist in holding said links in vertical position. The free ends of the arms 20 of the links 19 are here shown provided with eyes 22 through which and the cross bar 18, bolts 23 pass for pivotally connecting said links 19 with said bar 18 in longitudinally spaced relation. Clevises 24 are also connected with the bar 18, being preferably mounted on the bolts 23 and a flexible draft element 25 is connected with these clevises and is designed for connecting the drag or harrow with a plow if desired. It is to be understood however, that this harrow may be provided with the usual draft means and drawn directly over the ground to be pulverized without attaching it to the plow.

From the above description, it will be obvious that the vertically disposed links 3' which are arranged longitudinally of the harrow, perform a cutting operation while the vertically disposed cross links 11 perform a crushing or breaking action and also serve to throw any clods with which they come in contact and do not break, to opposite sides thereof into the paths of the vertically disposed cutting links which follow.

I claim as my invention:—

1. A harrow including a plurality of rows of links extending transversely of the harrow, and means connected with the links at opposite sides of the harrow for holding said rows in progressive offset relation longitudinally of the harrow.

2. A harrow including a plurality of rows of links extending transversely of the harrow, two of said rows being formed of vertically disposed links, the links of one row overlapping those of the other row, and a rod passing through said overlapping links and engaged at its opposite ends with links of rows connected with said vertical overlapping rows whereby said rows are held in offset relation longitudinally of the harrow and the links of the overlapping rows disposed obliquely relative to said rod.

3. A flexible harrow comprising a plurality of longitudinally disposed sections each provided with pulverizing elements, transversely disposed rods connecting said sections and each having means at its opposite ends for engaging the adjacent sections, the means at one end engaging a section at one side of the harrow and the means at the other end engaging the other section at the opposite side of the harrow for holding said sections in offset relation longitudinally.

4. A flexible harrow comprising a plurality of longitudinally disposed sections each provided with pulverizing elements, transversely disposed rods connecting said sections and each having outwardly opening hooks at its opposite ends for engaging the adjacent sections, the hooks at one end engaging a section at one side of the harrow and the hooks at the other end engaging the other section at the opposite side of the harrow for holding said sections in offset relation longitudinally.

5. A flexible harrow comprising a plurality of longitudinally disposed sections each provided with pulverizing elements, transversely disposed rods connecting said sections and each having obliquely disposed lateral arms extending in opposite directions from the ends thereof, and outwardly opening inwardly extending hooks at the terminals of said arms for engaging the respective sections at the opposite sides of the harrow.

6. A flexible harrow comprising a plurality of longitudinally disposed sections each provided with pulverizing elements, transversely disposed rods connecting said sections and each having obliquely disposed lateral arms extending in opposite directions from the ends thereof, and outwardly opening inwardly extending hooks at the terminals of said arms for engaging the respective sections at the opposite sides of the harrow, said rods being formed in sections and connected to turn independently of each other.

7. A flexible harrow comprising a plurality of longitudinally disposed sections each provided with pulverizing elements, transversely disposed rods connecting said sections and each having obliquely disposed lateral arms extending in opposite directions from the ends thereof, and outwardly opening inwardly extending hooks at the terminals of said arms for engaging the respective sections at the opposite sides of the harrow, said rods being formed in sections and connected to turn independently and move longitudinally of each other.

8. A flexible harrow comprising a plurality of longitudinally disposed sections each provided with pulverizing elements, transversely disposed rods connecting said sections and each having obliquely disposed lateral arms extending in opposite directions from the ends thereof, and outwardly opening inwardly extending hooks at the terminals of said arms for engaging the respective sections at the opposite sides of the harrow, said rods being formed in sections and a sleeve connecting the inner ends thereof.

9. A flexible harrow comprising a plurality of longitudinally disposed sections each provided with pulverizing elements, transversely disposed rods connecting said sections and each having obliquely disposed lateral arms extending in opposite directions from the ends thereof, and outwardly opening inwardly extending hooks at the terminals of said arms for engaging the respective sections at the opposite sides of the harrow, said rods being formed in sections and a sleeve connecting the inner ends thereof, with a pin extending transversely through said sleeve between said ends.

In testimony whereof I have hereunto set my hand in presence of two subscribing witnesses.

INGEBRIGT J. GLERUM.

Witnesses:
M. H. BRENNAN,
LOUIS A. GLERUM.

Copies of this patent may be obtained for five cents each, by addressing the "Commissioner of Patents, Washington, D. C."